US011906932B2

(12) United States Patent
Jeanrenaud et al.

(10) Patent No.: US 11,906,932 B2
(45) Date of Patent: Feb. 20, 2024

(54) DIAL FOR TIMEPIECES

(71) Applicant: Omega SA, Biel/Bienne (CH)

(72) Inventors: Frederic Jeanrenaud, La Chaux-de-Fonds (CH); Gregory Kissling, La Neuveville (CH)

(73) Assignee: Omega SA, Biel/Bienne (CH)

( * ) Notice: Subject to any disclaimer, the term of this patent is extended or adjusted under 35 U.S.C. 154(b) by 804 days.

(21) Appl. No.: 16/902,474

(22) Filed: Jun. 16, 2020

(65) Prior Publication Data

US 2021/0034018 A1 Feb. 4, 2021

(30) Foreign Application Priority Data

Jul. 31, 2019 (EP) .................................... 19189456

(51) Int. Cl.
*G04B 19/12* (2006.01)
*G04B 19/08* (2006.01)
*G04D 3/00* (2006.01)

(52) U.S. Cl.
CPC ............. *G04B 19/12* (2013.01); *G04B 19/08* (2013.01); *G04D 3/0048* (2013.01); *G04D 3/0092* (2013.01)

(58) Field of Classification Search
CPC ...... G04B 19/12; G04B 19/08; G04B 19/065; G04B 19/10; A44C 5/00; A44C 17/02; A44C 17/002
USPC .................................................. 368/232–234
See application file for complete search history.

(56) References Cited

U.S. PATENT DOCUMENTS

| | | | | |
|---|---|---|---|---|
| 4,740,935 A | | 4/1988 | Gogniat | |
| 4,884,256 A | * | 11/1989 | Blackburn ............. | G04B 19/10 968/153 |
| 4,999,822 A | * | 3/1991 | Blackburn ............. | G04B 19/10 368/294 |
| 5,237,546 A | * | 8/1993 | Vollert ................. | G04B 19/286 368/294 |

(Continued)

FOREIGN PATENT DOCUMENTS

| | | |
|---|---|---|
| CH | 711 378 A2 | 1/2017 |
| CN | 201480219 U | 5/2010 |

(Continued)

OTHER PUBLICATIONS

Wikipedia article on Mohs scale (table give conversion to HV); excepts from Wikipedia articles on Sapphire, Ruby, and Diamond (Year: 2023).*

(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A dial for a timepiece, preferably a watch, the dial being provided with a relief portion which is made as an assembly of pieces on different levels, juxtaposed on a base, such that the relief portion is formed by the upper surfaces of the pieces. A method for manufacturing the dial with several separate pieces, the upper surfaces of the pieces being subjected to a polishing step and/or possibly an enamelling step. The pieces are then cut along a defined contour and then assembled edge-to-edge on a base, so as to create the relief portion.

6 Claims, 6 Drawing Sheets

(56) References Cited

U.S. PATENT DOCUMENTS

| | | | | |
|---|---|---|---|---|
| 7,126,881 | B2 * | 10/2006 | Cooper | G04B 47/046 368/285 |
| 8,974,113 | B1 | 3/2015 | Chan | |
| 2013/0070573 | A1 * | 3/2013 | Oshio | G04B 19/10 368/235 |
| 2018/0271234 | A1 | 9/2018 | Monachon | |
| 2019/0133269 | A1 * | 5/2019 | Kakadiya | A44C 17/001 |

FOREIGN PATENT DOCUMENTS

| | | | |
|---|---|---|---|
| CN | 102305995 | A | 1/2012 |
| CN | 102339012 | A | 2/2012 |
| CN | 103019083 | A | 4/2013 |
| CN | 104570715 | A | 4/2015 |
| CN | 104859356 | A | 8/2015 |
| CN | 105307535 | A | 2/2016 |
| CN | 105676617 | A | 6/2016 |
| CN | 108621311 | A | 10/2018 |
| DE | 1 763 386 | | 3/1958 |
| EP | 0 015 242 | A1 | 9/1980 |
| EP | 0 294 661 | A1 | 12/1988 |
| EP | 3 378 346 | A1 | 9/2018 |
| JP | 58-66378 | U | 5/1983 |
| JP | 62-59887 | A | 3/1987 |
| JP | 2002-192900 | A | 7/2002 |

OTHER PUBLICATIONS

Combined Chinese Office Action and Search Report dated Jun. 3, 2021 in Patent Application No. 202010751039.2 (with English language translation and English translation of Category of Cited Documents), 16 pages.

Notice of the Reason for Refusal dated Jul. 6, 2021 in Japanese Patent Application No. 2020-115398 (with English language translation), 13 pages.

European Search Report dated Feb. 3, 2020 in European Application 19189456.7 file Jul. 31, 2019 (with English Translation of Categories of Cited Documents), 4 pages.

* cited by examiner

DIAL FOR TIMEPIECES

CROSS-REFERENCE TO RELATED APPLICATION

This application claims priority to European Patent Application No. 19189456.7 filed on Jul. 31, 2019, the entire disclosure of which is hereby incorporated herein by reference.

FIELD OF THE INVENTION

The present invention relates to a dial for a timepiece, particularly for a wristwatch, and more particularly to a polished and/or enamelled dial of this type whose visible surface includes a relief portion.

STATE OF THE ART

It is well known to manufacture dials that have a relief portion, consisting, for example, of a conical or pyramidal part on the outside of a flat circular part. Dials of this type are generally made by machining in the base material of the dial, such as stone or ceramic, to obtain the three-dimensional shape, followed by polishing and/or enamelling steps. One problem that is often encountered is that these polishing and enamelling processes round off the edges between the relief surfaces after machining, which detracts from the aesthetic effect of the watch.

SUMMARY OF THE INVENTION

The present invention aims to provide a method for manufacturing a dial for timepieces which overcomes the problems identified above.

To this end, the invention proposes a method for manufacturing a dial for a timepiece, the dial comprising a relief portion, wherein the relief portion is produced as an assembly of pieces on different levels, juxtaposed on a base, such that the relief portion is formed by the upper surfaces of the pieces, the method including the steps consisting in:

a) manufacturing semi-finished pieces by machining, b) treating said upper surfaces of the pieces after step a) to give the upper surfaces a defined aesthetic appearance.

c) cutting said treated pieces along a contour of defined geometry.

d) assembling the pieces obtained after step c), by juxtaposing the pieces on the base.

By applying surface treatment steps, in particular by polishing and/or enamelling operations on machined and cut pieces prior to assembling said pieces on a base or substrate, the invention makes it possible to make the relief portions with straight edges at the junctions between the various pieces forming the dial.

The invention also concerns a dial for a timepiece, preferably for a watch, the dial being provided with a relief portion which is made as an assembly of pieces on different levels, juxtaposed on a base, such that the relief portion is formed by the upper surfaces of the pieces.

Other features and advantages of the present invention will appear in the following description of preferred embodiments, given by way of non-limiting example, with reference to the annexed drawings.

DETAILED DESCRIPTION OF EMBODIMENTS OF THE INVENTION

Figure 1:
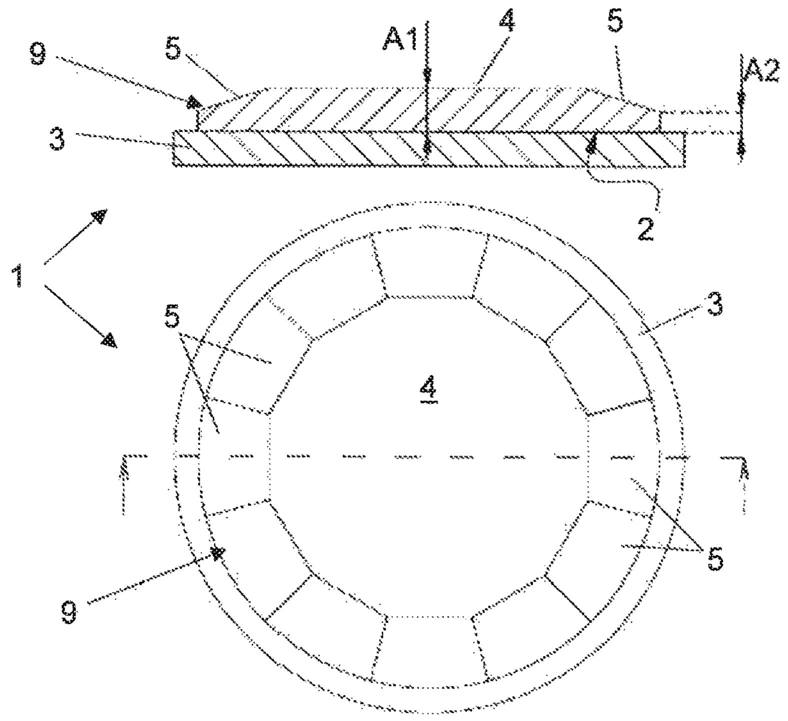
FIG. 1 represents a watch dial comprising a relief portion, as currently known.

An illustration of a dial 1 as known in the state of the art is represented in FIG. 1. The dial comprises a one-piece part 9 comprising a flat lower surface 2, attached, for example by bonding, to a base or substrate 3 intended to be placed on top of a watch movement, for example by means of dial feet (not represented). The upper surface comprises a relief portion, including a flat central part 4 which is situated on a first level A1 measured from a horizontal reference plane which here is the plane of base 3, and twelve surfaces 5 inclined from first level A1 to a second level A2 outside dial 1, the second level A2 being lower than first level A1. The current known method for manufacturing this dial consists in machining a cylindrical part made of metal, stone, or ceramic, for example. After machining, inclined surfaces 5 and central surface 4 are polished. During the polishing operation, the edges between the surfaces of the relief portion become rounded and ill-defined, detracting from the aesthetics of the dial. Depending on the material of part 9, the method may also include a step of enamelling the upper surface of the relief portion, this step applies notably when the dial is made of metal. Here too, the enamelling operating will have the effect of rounding the edges.

To make the same dial by the method of the invention, several separate pieces are first manufactured by machining to produce basic semi-finished pieces having an upper surface. The upper surfaces of the elementary pieces are treated to give such elementary surfaces a defined aesthetic appearance. The upper surfaces of these elementary pieces are, for example, polished and/or possibly enamelled. These upper surfaces can also be subjected to structuring treatments to form decorations such as Cotes de Geneve, stippling, circular graining, sand blasting, satin finishing, etc. Having undergone a treatment of their upper surface, the elementary pieces are then cut along a contour having a defined geometry, and then assembled on base 3 by juxtaposition, preferably edge-to-edge.

Figure 2:
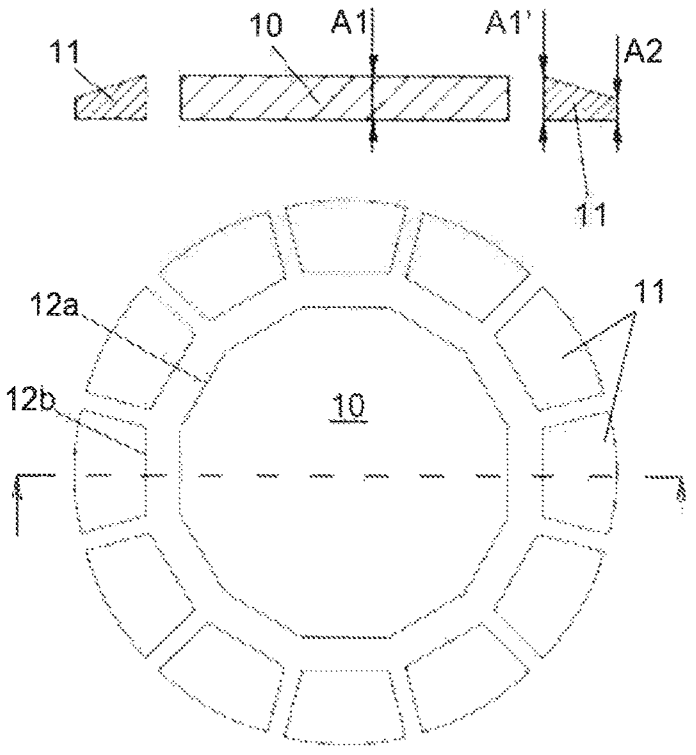
FIG. 2*a* represents the constituent pieces of a dial made according to the method of the invention.

A set of elementary pieces made according to one implementation of the method of the invention is represented in FIG. 2: the set of these elementary pieces comprises a parallelepiped 10 having a thickness A1 and twelve straight side faces, in addition to twelve identical pieces 11 having a side face whose width corresponds to the width of the side faces of parallelepiped 10. The upper surface of pieces 11 is inclined between thickness A1' and A2. Thicknesses A1 and A1' can also be equal, but A1' is preferably slightly smaller or greater than A1, for example by several tens of a micrometre. Elementary pieces 10 and 11 can be manufactured using machining techniques known per se, such as grinding, laser ablation, ultrasonically assisted machining and/or laser cutting. Upper surfaces 4 and 5 of pieces 10 and 11 then undergo a surface treatment to give the upper surfaces a defined aesthetic look, in this case polishing, using known state-of-the-art techniques, such as barrel, flat disc or fine wheel polishing.

When pieces 10 and 11 are made of metal or ceramic, the upper surfaces of the pieces can be wholly or partly, alternately subjected to an enamelling step.

According to one embodiment, one-piece part 9 used in the state-of-the-art method illustrated in FIG. 1 is manufactured by machining according to a conventional method, polished, and then cut, for example by laser cutting, to obtain elementary pieces 10 and 11.

Figure 3A:
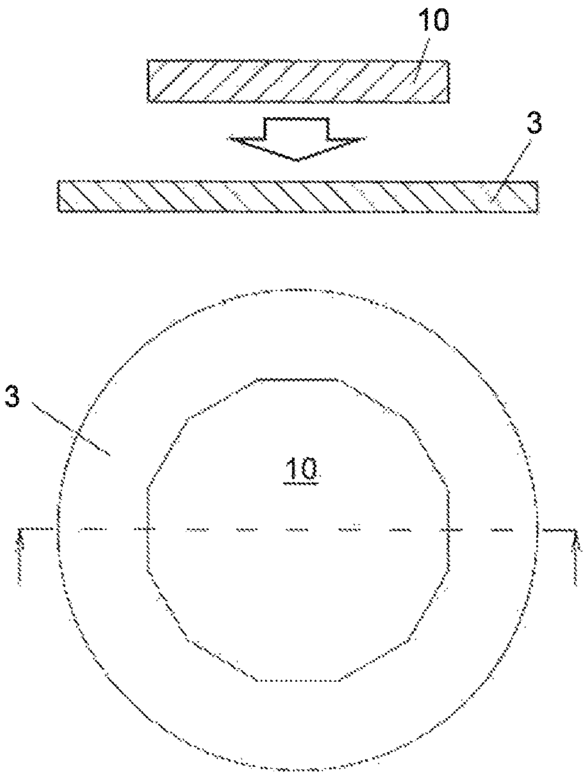
FIGS. 3*a*-3*c* represent the dial assembly steps according to the method of the invention.
Figure 3B:
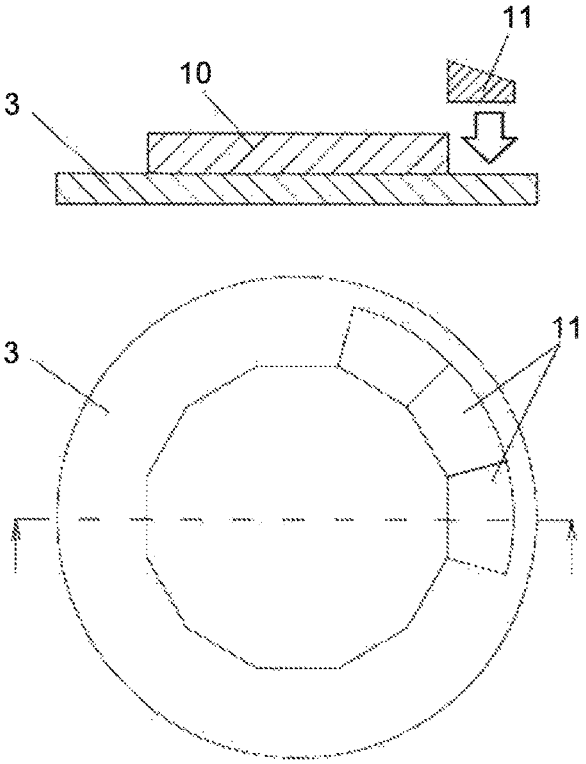
Figure 3C:
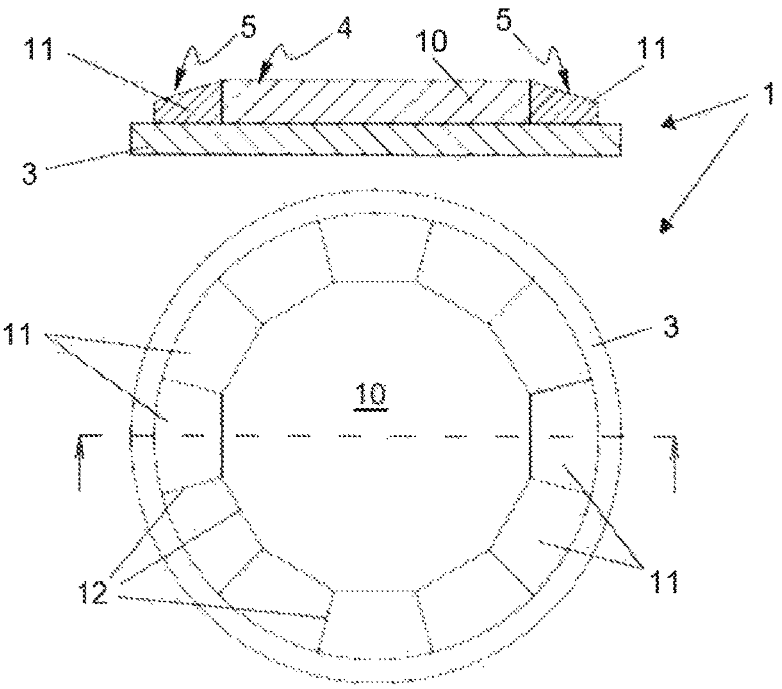

The elementary pieces 10 and 11 obtained and whose upper surfaces 4 and 5 are polished and/or enamelled are then assembled edge-to-edge, by placing them on base 3 of the watch, as illustrated in FIGS. 3*a* to 3*c*. Elementary pieces 10 and 11 are secured on the base by a method known per se, preferably by bonding or by a mechanical connection, such as by pins, or by a combination of such methods.

Preferably, parallelepiped 10 is mounted first, followed by side pieces 11 which are juxtaposed with the side faces of parallelepiped 10, and with the faces of two adjacent pieces 11. Polished and/or enamelled pieces 10 and 11 are made with strict dimensional tolerances, such that gap-free contact is achieved for all the adjacent interfaces of the contiguous elementary pieces. Thus, this method makes it possible to make a dial 1 in relief with straight edges 12, each of these edges 12 being defined by the junction between the apex lines 12*a*, 12*b* of two contiguous elementary pieces 10, 11.

Figure 4:
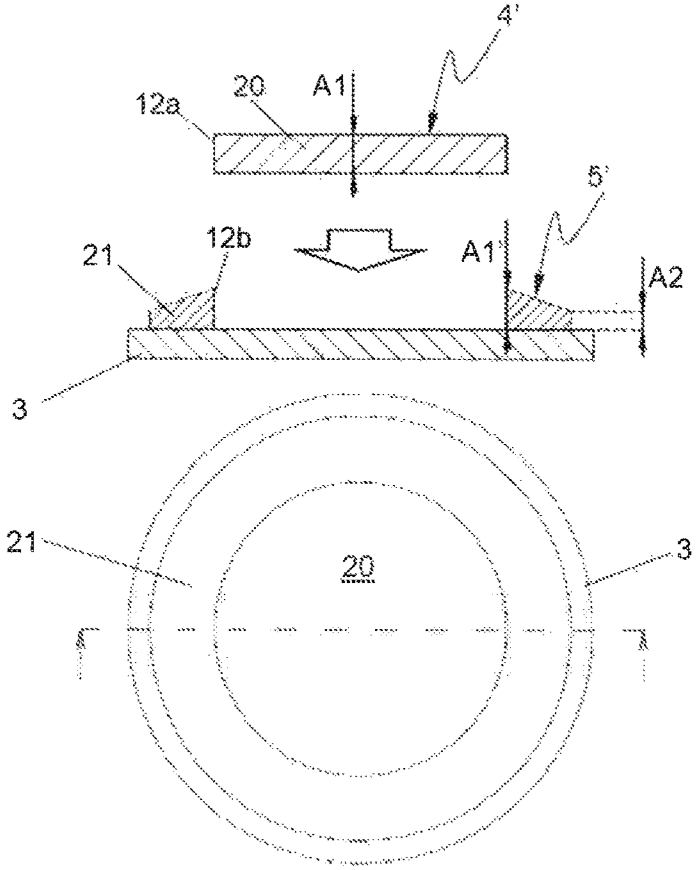
FIG. 4 represents another example of a dial made according to the method of the invention.

FIG. 4 represents another example of a dial manufactured according to the method of the invention, and in which the relief portion is made by assembling two elementary pieces: a cylindrical piece 20 having a thickness A1 and a conical piece 21 which forms a relief portion between A1' and A2, A2 being smaller than A1' (the ratio between A1 and A1' is the same as that described for the embodiment represented in FIGS. 2 and 3*a*-3*c*). The two pieces 20 and 21 are manufactured separately. Upper surfaces 4' and 5' are polished and/or enamelled and then cut to final form. Pieces 20 and 21 are then assembled on base 3.

Figure 5:
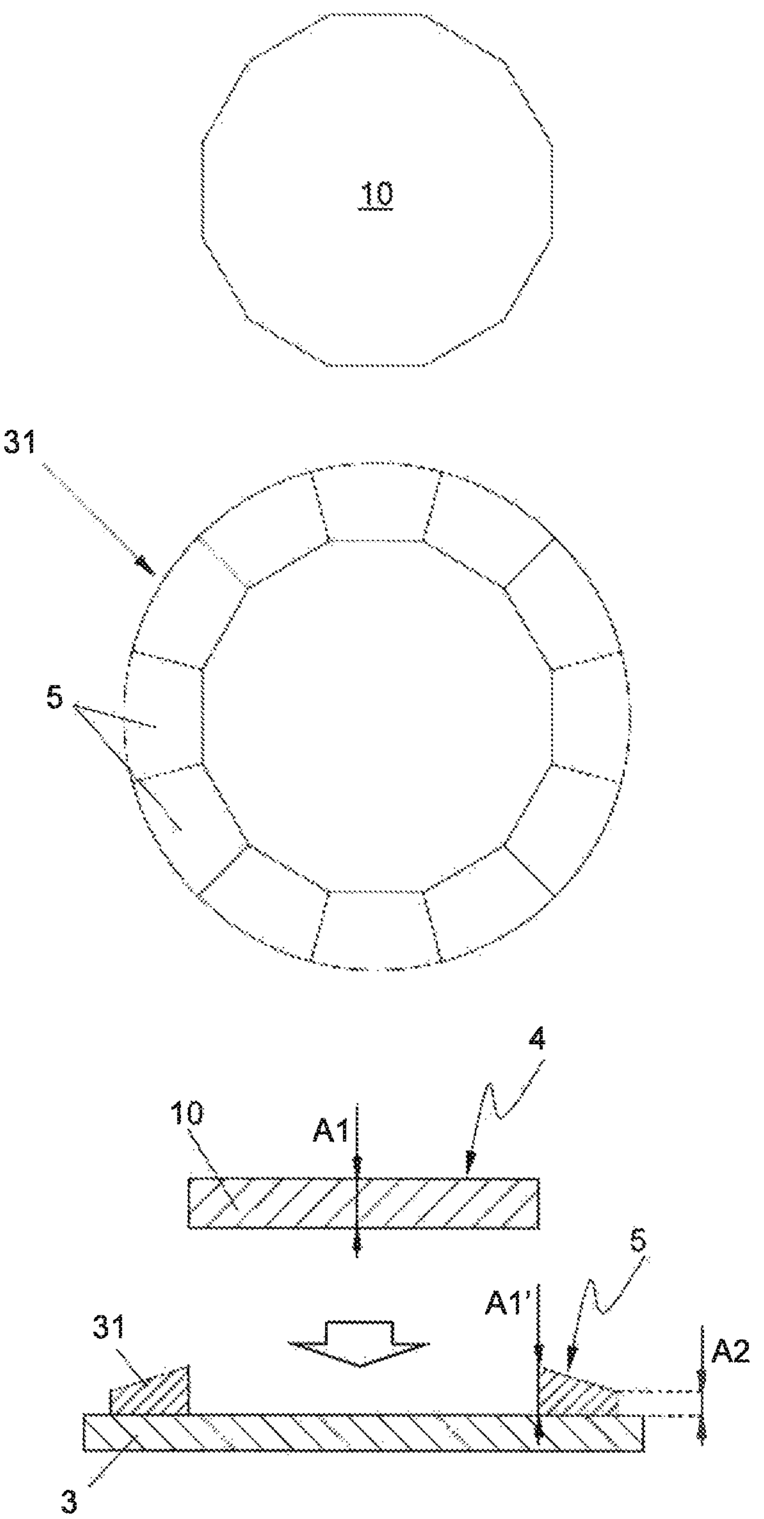
FIG. 5 represents an alternative embodiment for manufacturing the dial of FIG. 3*c*.

FIG. 5 represents an example of the dial with twelve inclined surfaces, i.e. the same dial as represented in FIGS. 1 to 3 but made by assembling two pieces 10 and 31: parallelepiped 10 and a ring 31. Ring 31 comprising twelve inclined surfaces 5 between A1' and A2 is made as a one-piece part, preferably by laser cutting the part 9 represented in FIG. 1. Upper surfaces 4 and 5 of pieces 10 and 31 are then polished and/or enamelled, then cut to final form before being assembled on base 3.

Figure 6:
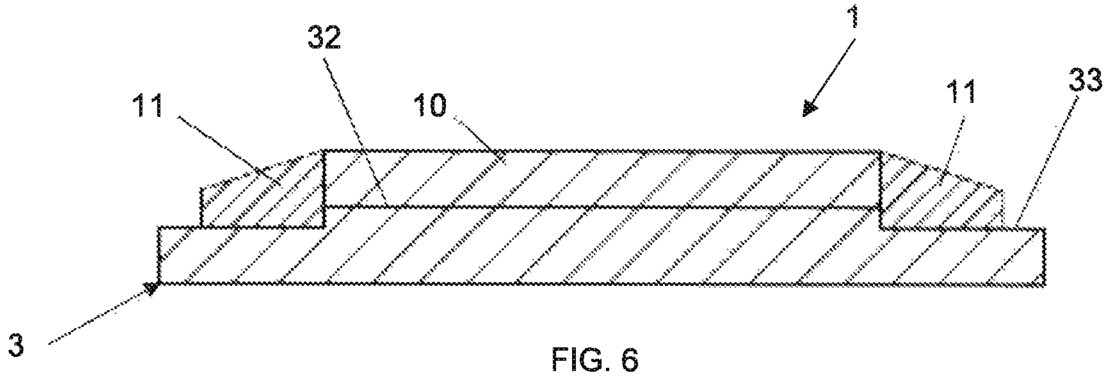
FIG. 6 represents a dial made according to the method of the invention comprising a base with different levels.

According to one embodiment, base 3 comprises several levels, and the thickness of the pieces which define the relief portion takes account of the height of these levels. FIG. 6 represents a dial assembled according to the method of the invention and which has the same external appearance of the dial of FIGS. 2 and 3*a*-3*c*, but wherein parallelepiped 10 is mounted on a central raised portion of base 3. The level of the central portion of the base is higher than the level of external portion 33 of the base, on which pieces 11 are mounted.

Figure 7:
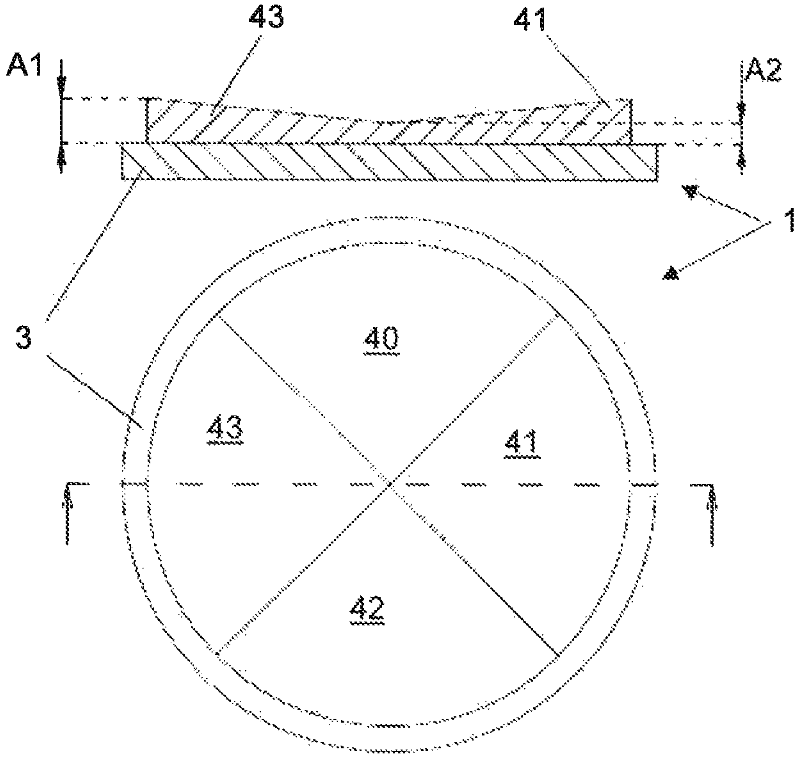
FIG. 7 represents a dial made according to the invention, comprising a negative relief portion.

It is also possible to make a negative relief portion by the method of the invention. An example is represented in FIG. 7. This dial includes four pieces 40 to 43 mounted on base 3, which form a relief portion between a thickness A1 outside the dial and a thickness A2 smaller than A1 at the centre of the dial.

Figure 8:
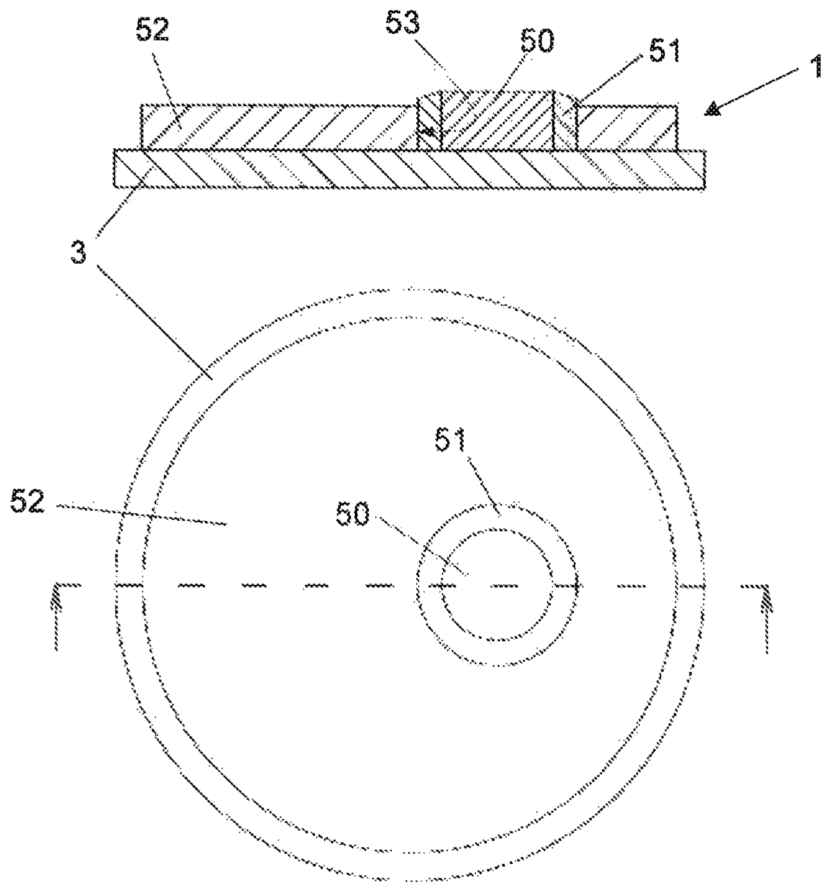
FIG. 8 represents a dial made according to the invention comprising a local relief portion.

The invention is not limited to the embodiments described above. The relief portion does not necessarily extend over the entire surface of the dial. An example of a local relief portion made by the method of the invention is illustrated in FIG. 8. The relief portion includes a central cylindrical piece 50 surrounded by a conical piece 51, the pieces being integrated in a cylindrical hole 53 provided in flat dial 52. The assembly of the relief portion is thus achieved by manufacturing pieces 50, 51 and 52, followed by polishing and/or enamelling the pieces, cutting to form, and then assembling the pieces on base 3.

The invention claimed is:

1. A dial for a timepiece, the dial comprising:
- a base; and
- an assembly of elementary pieces disposed on the base, the assembly of elementary pieces forming a relief portion and including
  - a first central elementary piece having a first thickness, and
  - at least one second elementary piece with an upper surface which is inclined between a first thickness and a second thickness,
- wherein the relief portion is formed by an upper surface of the first central elementary piece and the upper surface of the at least one second elementary piece, and
- wherein the relief portion includes a straight edge defined by a junction between apex lines of the first central elementary piece and the at least one second elementary piece.

2. The dial according to claim 1, wherein the assembly of elementary pieces extends over an entire surface of the dial.

3. The dial according to claim 1, wherein the assembly of elementary pieces is situated on one portion of the dial.

4. The dial according to claim 1, wherein the first central elementary piece and the at least one second elementary piece are made of a material with an HV hardness greater than 500.

5. The dial according to claim 4, wherein the first central elementary piece and the at least one second elementary piece are made of sapphire, alumina, zirconia or natural stones.

6. A timepiece comprising:
- a dial, the dial comprising
  - a base; and
  - an assembly of elementary pieces disposed on the base, the assembly of elementary pieces forming a relief portion and including
    - a first central elementary piece having a first thickness, and
    - at least one second elementary piece with an upper surface which is inclined between a first thickness and a second thickness,
  - wherein the relief portion is formed by an upper surface of the first central elementary piece and the upper surface of the at least one second elementary piece, and
  - wherein the relief portion includes a straight edge defined by a junction between apex lines of the first central elementary piece and the at least one second elementary piece.

* * * * *